US011833664B2

(12) United States Patent
Ibi

(10) Patent No.: US 11,833,664 B2
(45) Date of Patent: Dec. 5, 2023

(54) ROBOT APPARATUS, CONTROL METHOD FOR ROBOT APPARATUS, METHOD OF MANUFACTURING ARTICLE USING ROBOT APPARATUS, COMMUNICATION DEVICE, COMMUNICATION METHOD, CONTROL PROGRAM, AND RECORDING MEDIUM

(71) Applicant: CANON KABUSHIKI KAISHA, Tokyo (JP)

(72) Inventor: Toshio Ibi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 643 days.

(21) Appl. No.: 16/797,812

(22) Filed: Feb. 21, 2020

(65) Prior Publication Data

US 2020/0276716 A1    Sep. 3, 2020

(30) Foreign Application Priority Data

Feb. 28, 2019   (JP) ................................. 2019-036673

(51) Int. Cl.
*B25J 13/00* (2006.01)
*B25J 9/16* (2006.01)
*B25J 9/12* (2006.01)

(52) U.S. Cl.
CPC ........... *B25J 13/006* (2013.01); *B25J 9/1679* (2013.01); *B25J 9/126* (2013.01)

(58) Field of Classification Search
CPC ........ B25J 13/006; B25J 9/1679; B25J 9/126; B25J 9/161; B25J 9/16; B25J 9/1689; B25J 19/00; G05B 2219/33192; G05B 2219/33219; H04B 1/02; H04B 1/06
See application file for complete search history.

(56) References Cited

U.S. PATENT DOCUMENTS

| 11,281,202 B2 * | 3/2022 | Cella .................. G05B 23/0291 |
| 11,282,122 B1 * | 3/2022 | Lang .................. G06Q 30/0629 |
| 2011/0185556 A1 * | 8/2011 | Hirano .................. B25J 9/0087 901/30 |
| 2014/0106803 A1 | 4/2014 | Eguchi |
| 2017/0239822 A1 | 8/2017 | Sakata |
| 2017/0360520 A1 * | 12/2017 | Hares .................... A61B 34/35 |
| 2018/0250086 A1 * | 9/2018 | Grubbs ................ A61B 34/35 |
| 2019/0282315 A1 * | 9/2019 | Loh ........................ A61B 34/71 |
| 2020/0276716 A1 * | 9/2020 | Ibi ............................ B25J 9/161 |
| 2022/0009107 A1 * | 1/2022 | Zimmer .................. H04B 1/06 |

(Continued)

FOREIGN PATENT DOCUMENTS

| CN | 101065220 A | 10/2007 |
| CN | 203774818 U | 8/2014 |
| CN | 104875209 A | 9/2015 |

(Continued)

*Primary Examiner* — Robert T Nguyen
(74) *Attorney, Agent, or Firm* — Canon U.S.A., Inc., IP Division

(57) ABSTRACT

A robot apparatus capable of performing a stable wireless communication is provided. The robot apparatus includes a robot arm including a link, a first control device disposed in the robot arm, a second control device, and a wireless communication unit configured to enable the first control device and the second control device to communicate with each other wirelessly. The wireless communication unit is disposed in the link.

24 Claims, 9 Drawing Sheets

(56) References Cited

U.S. PATENT DOCUMENTS

2023/0145095 A1* 5/2023 Onaka .................. H04B 1/0057
455/73

FOREIGN PATENT DOCUMENTS

| CN | 105790445 A | 7/2016 |
| CN | 106826825 A | 6/2017 |
| CN | 107870610 A | 4/2018 |
| DE | 102018006044 A1 | 1/2019 |
| JP | 2005-217799 A | 8/2005 |
| JP | 2009078325 A | 4/2009 |
| JP | 2014-225764 A | 12/2014 |

* cited by examiner

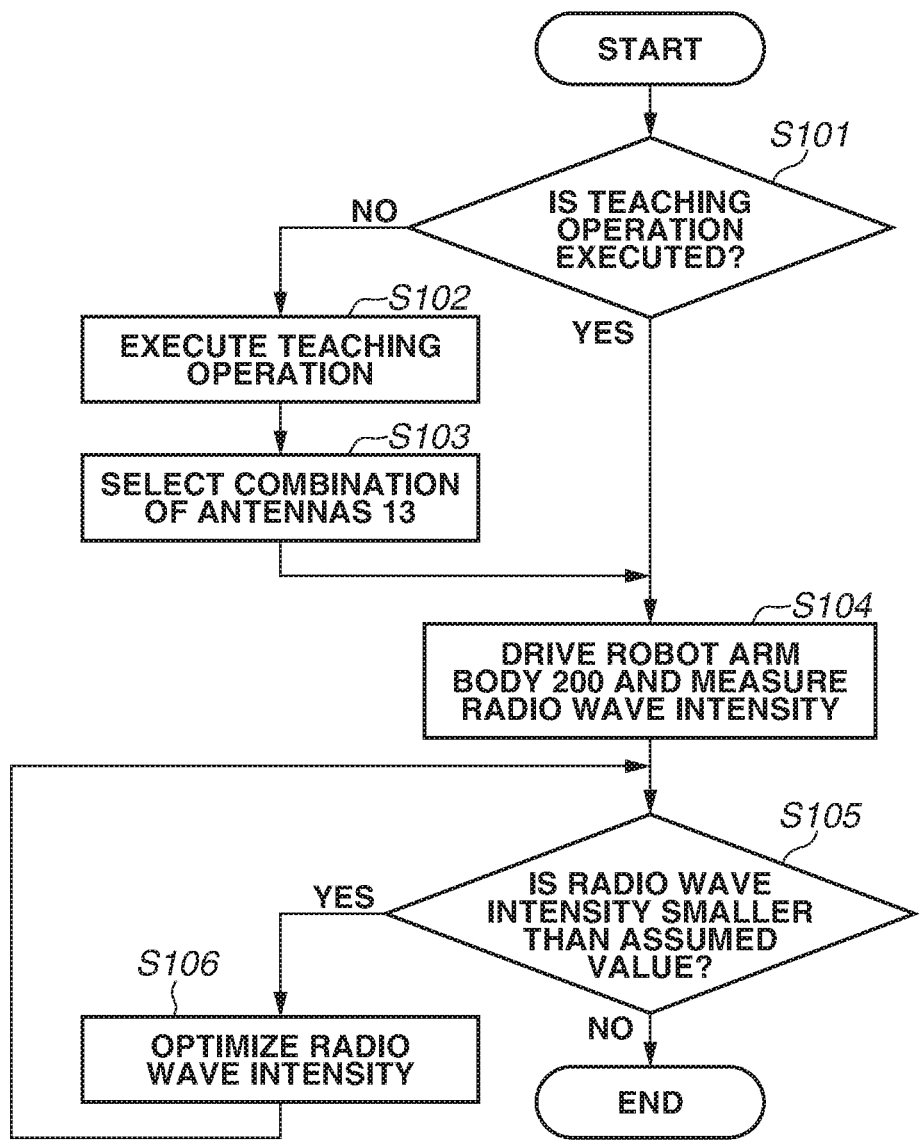

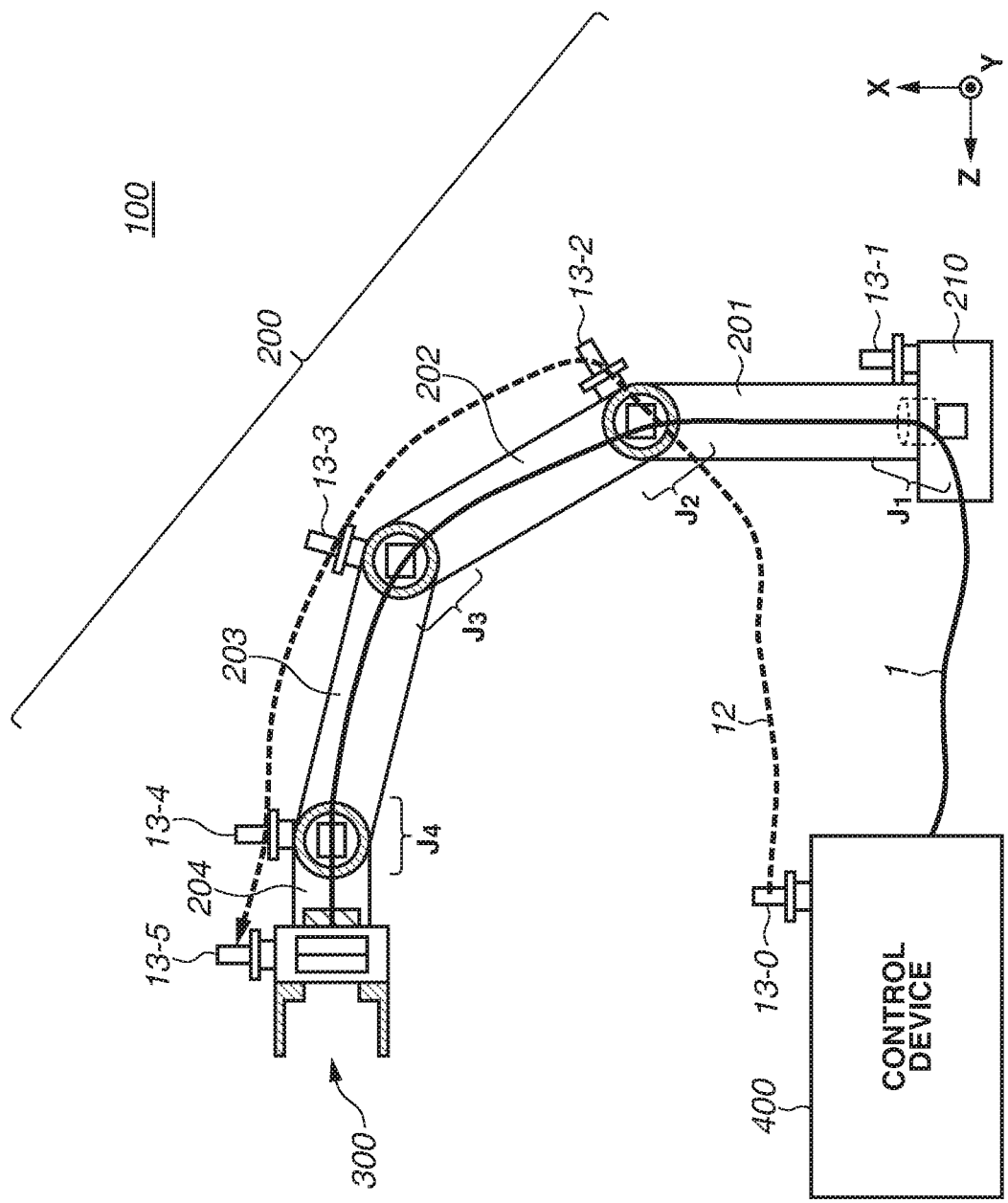

ROBOT APPARATUS, CONTROL METHOD FOR ROBOT APPARATUS, METHOD OF MANUFACTURING ARTICLE USING ROBOT APPARATUS, COMMUNICATION DEVICE, COMMUNICATION METHOD, CONTROL PROGRAM, AND RECORDING MEDIUM

BACKGROUND

Field

The present disclosure relates to a robot apparatus that uses wireless communication.

Description of the Related Art

In recent years, robot apparatuses including an articulated robot arm have been used on production lines for manufacturing products. A robot arm of this type is provided with a gripping device, such as a robot hand, or a tool or the like, as an end effector at a leading end thereof, and operates a workpiece to manufacture an article such as an industrial product or a part thereof.

A robot hand functioning as the end effector is provided with a finger portion for gripping a workpiece. The robot hand converts torque from a motor incorporated in the robot hand into a linear motion using a gear and transmits the linear motion to the finger portion, to grip the workpiece.

The robot arm includes a joint that connects a link with another link. The robot arm also includes, as a joint mechanism, for example, a motor, such as an alternate current (AC) servomotor or a direct current (DC) brushless servomotor, and a reduction gear provided at an output side, and controls a link operation.

Heretofore, in a case where control signals for controlling a motor incorporated in the end effector and the motor incorporated in the robot arm are transmitted to the motors, the control signals have generally been transmitted via a communication cable wired in the robot arm.

However, the robot arm is constantly moving, and thus the communication cable used in the robot arm is required to have an inflection resistance. In addition, in order to control motors provided in each joint of the robot arm and the robot hand, the number of communication cables increases. This causes the inflection resistance of each communication cable to deteriorate, and the robot arm needs to be thickened to secure a space for the communication cable.

To solve the above-described problem, various wireless communication methods are proposed for the robot apparatus to realize wireless communication in the robot apparatus.

Examples of the wireless communication methods include methods using protocols such as (Ethernet for Control Automation Technology) EtherCAT, Control & Communication (CC)-Link Industrial Ethernet (IE), (Process Field Bus Decentralized Periphery) PROFIBUS-DP, and Mechatrolink-III, which are capable of establishing high-speed communication, in addition to a Controller Area Network (CAN) and Recommended Standards (RS)-485, which have been heretofore used.

In addition, Japanese Patent Application Laid-Open No. 2005-217799 discusses a method in which various electronic devices wirelessly send data that require multiplexing, such as high-speed data which cannot be easily transmitted by a wired connection, or data to be transmitted via a bus line in order to reduce the number of communication cables, while the various electronic devices send, via a wire, data for which high-speed large-amount data transfer is not required.

With this method, the number of communication cables for transmitting data necessary for multiplexing can be reduced.

However, the robot arm can take various orientations depending on an operation to be executed. Depending on the orientation of the robot arm, a peripheral device or a link of the robot arm is disposed between a control device and a communication target device, which may make the wireless communication unstable.

In addition, generally-used wireless transmission methods (e.g., Wireless Fidelity (Wi-Fi) Institute of Electrical and Electronics Engineers (IEEE) 802.1, 4G, and 5G) use a frequency of 1 GHz or higher and a high rectilinear advancing property. Accordingly, even if the communication target deviates only slightly from a communicable area depending on the orientation of the robot arm, the communication can be interrupted.

The method discussed in Japanese Patent Application Laid-Open No. 2005-217799 assumes an electronic device in which no shielding material is disposed between a transmission target and a reception target, like in a laptop personal computer (PC), and thus wireless communication can be stably performed while preventing the transmission target and the reception target from deviating from the communicable area. Therefore, it is difficult for the method to deal with the above-described interruption of wireless connection that may occur during a great motion performed by the robot arm.

SUMMARY

In view of the above-described issues, the present disclosure is directed to providing a robot apparatus capable of performing a stable wireless communication.

According to an aspect of the present disclosure, a robot apparatus includes a robot arm including a link, a first control device disposed in the robot arm, a second control device, and a wireless communication unit configured to enable the first control device and the second control device to communicate with each other wirelessly. The wireless communication unit is disposed in the link.

Further features of the present disclosure will become apparent from the following description of exemplary embodiments with reference to the attached drawings.

BRIEF DESCRIPTION OF THE DRAWINGS

FIG. 4 is a flowchart illustrating control processing according to the exemplary embodiment.

FIG. 6 is a plan view illustrating a case where the combination of antennas to be used is changed according to the exemplary embodiment.

DESCRIPTION OF THE EMBODIMENTS

Embodiments for carrying out the present disclosure will be described below with reference to the accompanying drawings. Configurations described below are merely examples, and details thereof can be appropriately modified by one skilled in the art within the scope of the present disclosure. In addition, numerical values mentioned in exemplary embodiments are values merely for reference and should not limit the present disclosure.

Figure 1:
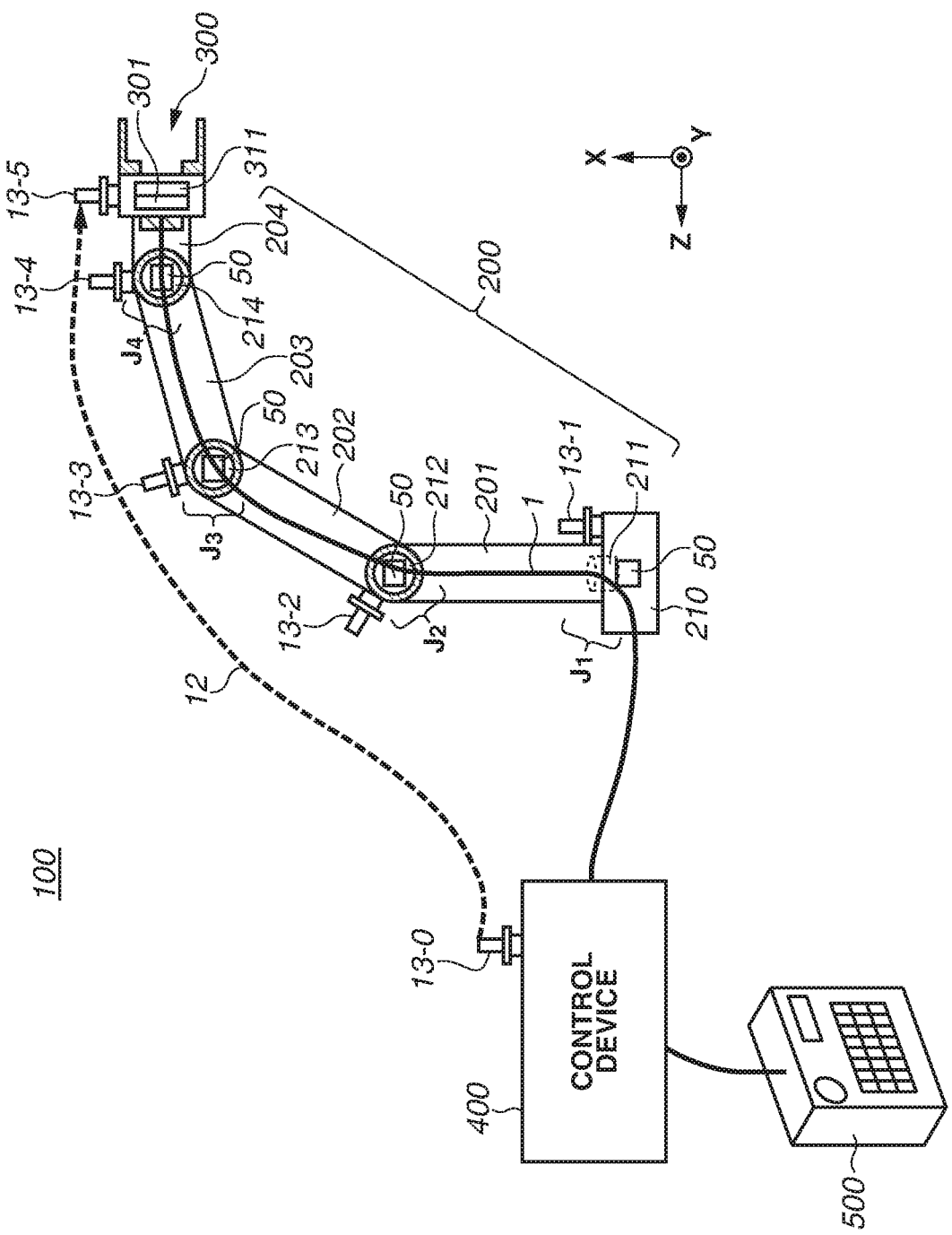
FIG. 1 is a plan view illustrating a schematic configuration of a robot apparatus according to an exemplary embodiment of the present disclosure.

A first exemplary embodiment will be described below. FIG. 1 is a plan view illustrating a robot apparatus 100 according to the first exemplary embodiment as viewed in a certain direction. In the drawings described below, arrows X, Y, and Z represent a coordinate system of the entire robot apparatus 100. In a general robot system using a robot apparatus, not only a global coordinate system representing an overall installation environment, but also a local coordinate system representing a position of a robot hand, a finger portion, or the like is used, as needed, as an XYZ three-dimensional coordinate system, depending on a control operation or the like to be executed. In the present exemplary embodiment, the coordinate system of the entire robot apparatus 100 is represented by XYZ, and a local coordinate system is represented by xyz.

As illustrated in FIG. 1, the robot apparatus 100 includes an articulated robot arm body 200, a robot hand body 300, and a control device 400 that controls an overall operation of the robot apparatus 100.

The robot apparatus 100 also includes an external input device 500 as a teaching device that transmits teaching data to the control device 400. An example of the external input device 500 is a teaching pendant, which is used for an operator to designate the positions of the robot arm body 200 and the robot hand body 300.

The present exemplary embodiment illustrates a case where a robot hand is provided as an end effector at a distal end of the robot arm body 200. However, the end effector is not limited to a robot hand, but instead a tool or the like may be used.

A link 201 which is a proximal end of the robot arm body 200 is disposed on a base 210.

The robot hand body 300 grips an object such as a part or a tool. The robot hand body 300 according to the present exemplary embodiment uses a drive mechanism (not illustrated) and a motor 311 to open or close two finger portions to thereby grip or release a workpiece. The robot hand body 300 may grip the workpiece while preventing the workpiece from being displaced relatively to the robot arm body 200.

The present exemplary embodiment illustrates an example where two finger portions are configured to grip an object. However, the finger portions may be provided with a pneumatic mechanism or an adhesive mechanism to hold the workpiece by adsorbing the workpiece.

A hand motor driver 301 that controls driving of the motor 311 is incorporated in the robot hand body 300.

The robot hand body 300 is connected to a link 204. The robot hand body 300 can be rotated by the rotation of the link 204.

The robot arm body 200 includes a plurality of joints, such as four joints (four axes). The robot arm body 200 also includes a plurality of (four) motors 211 to 214 that rotationally drive joints $J_1$ to $J_4$, respectively, about the corresponding rotation axis.

The motors 211 to 214 connect links 201 to 204 directly or via a transmission member such as a belt, a bearing, or the like (not illustrated).

If torque for driving the links 201 to 204 is insufficient, a reduction gear (not illustrated) may be disposed at the rotation axis of each of the motors 211 to 214 to amplify the torque.

In the robot arm body 200, the plurality of links 201 to 204 is rotatably connected to each other in the joints $J_1$ to $J_4$. In this case, the links 201 to 204 are sequentially connected in series in a direction from the proximal end of the robot arm body 200 to the distal end thereof.

The motors 211 to 214, which are disposed in the joints $J_1$ to $J_4$, respectively, are each provided with an arm motor driver 50 that controls the corresponding motor.

In the present exemplary embodiment, a node control system in which a driver for controlling a motor in each joint is disposed at each axis is adopted as a method for controlling the robot arm.

The node control system is operated when power and control signals are sent to the arm motor drivers 50, which are disposed in the joints $J_1$ to $J_4$, respectively. Accordingly, in the node control system, plane-wave method (PWM) noise is not likely to occur and the length of a sensor wire can be reduced when a sensor or the like is placed, which leads to a reduction in the noise effects coming from the sensor.

Thus, the noise that occurs in each device can be prevented from adversely affecting wireless communication.

As illustrated in FIG. 1, the base 210 and the link 201 of the robot arm body 200 are connected with the joint $J_1$. The rotation axis of the joint $J_1$ matches an X-axis direction in a state illustrated in FIG. 1.

The link 201 and the link 202 of the robot arm body 200 are connected with the joint $J_2$. The rotation axis of the joint $J_2$ matches a Y-axis direction in the state illustrated in FIG. 1.

The link 202 and the link 203 of the robot arm body 200 are connected with the joint $J_3$. The rotation axis of the joint $J_3$ matches the Y-axis direction in the state illustrated in FIG. 1.

The link 203 and the link 204 of the robot arm body 200 are connected with the joint $J_4$. The rotation axis of the joint $J_4$ matches the Y-axis direction in the state illustrated in FIG. 1.

With the configuration described above, the robot arm body 200 can direct the end effector (robot hand body 300) of the robot arm body 200 in arbitrary three-direction orientations, at any three-dimensional positions, within a movable range.

A leading end of a hand portion of the robot arm body 200 corresponds to the robot hand body 300 in the present exemplary embodiment. In a case where robot hand body 300 grips an object, the robot hand body 300 and an object (e.g., a part or a tool) gripped by the robot hand body 300 are collectively referred to as the leading end of the hand portion of the robot arm body 200.

In other words, the robot hand body 300 functioning as the end effector is referred to as the leading end of the hand portion, regardless of whether the robot hand body 300 is gripping an object or not.

With the configuration described above, the robot arm body 200 can cause the robot hand body 300 to operate at any position to perform a desired operation. Examples of the desired operation include an operation of gripping the workpiece, and assembling the gripped workpiece to a predetermined workpiece, to manufacture an article.

The robot hand body 300 may be, for example, an end effector such as an air hand using a pneumatic driving method.

The robot hand body 300 can be attached to the link 204 by a semi-fixing means such as fixation with a screw, or by an attachment/detachment means such as latching.

In particular, if the robot hand body 300 is detachably mountable, the following system can also be employed. That is, the robot arm body 200 is controlled to attach/detach or replace various types of robot hand bodies 300 disposed at a supply position by the operation of the robot arm body 200 itself.

A plurality of antennas 13, each of which serves as a wireless communication unit, is provided as illustrated in FIG. 1 to establish wireless communication among the control device 400, the hand motor driver 301 incorporated in the robot hand body 300, and the arm motor drivers 50.

In the present exemplary embodiment, six antennas 13 are installed in the robot apparatus 100. The antenna disposed on the control device 400 is referred to as an antenna 13-0, and the antenna disposed on the base 210 is referred to as an antenna 13-1. Similarly, the antenna disposed in the vicinity of the joint $J_2$ is referred to as an antenna 13-2, the antenna disposed in the vicinity of the joint $J_3$ is referred to as an antenna 13-3, the antenna disposed in the vicinity of the joint $J_4$ is referred to as an antenna 13-4, and the antenna disposed on the robot hand body 300 is referred to as an antenna 13-5.

In the present exemplary embodiment, generally-used wireless transmission methods (e.g., Wireless Fidelity (Wi-Fi) Institute of Electrical and Electronics Engineers (IEEE) 802.1, 4G, and 5G) are adopted for the antennas 13 to be used.

By wireless communication via the antennas 13, operation data used to cause the robot hand body 300 to operate is transmitted from the control device 400 to the hand motor driver 301 through a wireless communication path 12. Similarly, the wireless communication path 12 is also used for transmitting data to the arm motor drivers 50 corresponding to the joints $J_1$ to $J_4$, respectively.

The antennas 13 described above enable wireless communication. The antennas 13 will be described in detail below.

The control device 400 according to the present exemplary embodiment also functions as a power supply device for supplying power to the robot apparatus 100.

The power to the motor 311 is supplied to the motor 311 from the control device 400 through a power supply cable 1.

Figure 2:
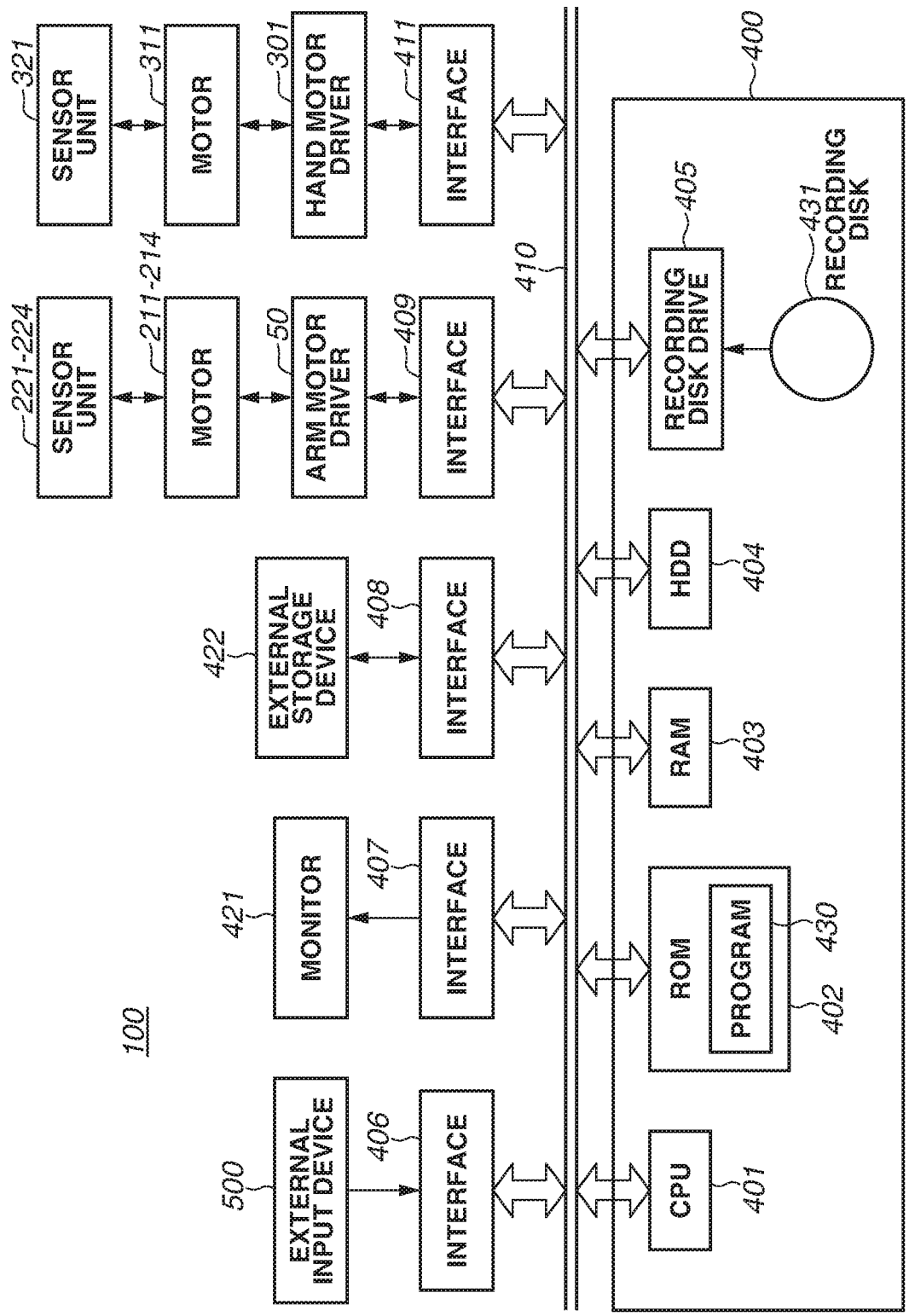
FIG. 2 is a block diagram illustrating the robot apparatus according to the exemplary embodiment.

FIG. 2 is a block diagram illustrating a configuration example of the robot apparatus 100 according to the present exemplary embodiment. The robot arm control device 400 is composed of a computer, and includes a central processing unit (CPU) 401 as a control unit (processing unit).

The control device 400 also includes, as storage units, a read-only memory (ROM) 402, a random access memory (RAM) 403, and a hard disk drive (HDD) 404. The control device 400 also includes a recording disk drive 405 and various interfaces 406 to 409 and 411.

The CPU 401 is connected to each of the ROM 402, the RAM 403, the HDD 404, the recording disk drive 405, and the various interfaces 406 to 409 and 411 via a bus 410.

The ROM 402 stores a program 430 for causing the CPU 401 to execute arithmetic processing. The CPU 401 executes each process of a robot control method based on the program (recorded) stored in the ROM 402.

The RAM 403 is a storage device that temporarily stores various data such as arithmetic processing results obtained by the CPU 401.

The HDD 404 is a storage device that stores arithmetic processing results obtained by the CPU 401, various data externally acquired, and the like.

The recording disk drive 405 can read out various data, programs, and the like recorded on a recording disk 431.

The external input device 500 is connected to the interface 406. The CPU 401 receives teaching data from the external input device 500 via the interface 406 and the bus 410.

The motors 211 to 214 that drive the joints $J_1$ to $J_4$, respectively, include sensor units 221 to 224, which are connected to the motors 211 to 214, respectively. The motor 311 that drives the finger portions of the robot hand body 300 includes a sensor unit 321 which is connected to the motor 311.

The term "sensor" used herein refers to an angular sensor for detecting a rotational angle of the rotation axis of each of the motors 211 to 214 and the sensor unit 321. Examples of the sensor include a magnetic encoder and an optical encoder.

The encoders have, for example, an absolute encoder function and an increment encoder function as their functions. The increment encoder can detect an angle of a motor in one rotation, and the absolute encoder can count the number of rotations of a motor when the motor rotates a plurality of times.

The robot arm according to the present exemplary embodiment includes a joint that is rotated 360° or more, and, therefore, the absolute encoder is used for the robot arm in the present exemplary embodiment.

The arm motor driver 50 is connected to the interface 409. The CPU 401 acquires detection results from the sensor units 221 to 224 via the interface 409 and the bus 410. Further, the CPU 401 outputs command values data for the respective joints to an arm motor driver 50 via the bus 410 and the interface 409 at a predetermined time interval.

Similarly, the hand motor driver 301 is connected to the interface 411 so that the hand motor driver 301 can communicate with the CPU 401 via the bus 410. The CPU 401 acquires a detection result from the sensor unit 321 via the hand motor driver 301, the bus 410, and the interface 411. Further, the CPU 401 outputs the command value data of the respective finger portions to the hand motor driver 301 via the bus 410 and the interface 411 at a predetermined time interval.

The interface 407 is connected to a monitor 421. Various images are displayed on the monitor 421 under control of the CPU 401. The interface 408 is configured to be connectable with an external storage device 422. The external storage device 422 is a storage unit such as a rewritable nonvolatile memory or an external HDD.

The present exemplary embodiment illustrates a case where the HDD 404 is used as a computer-readable recording medium and the program 430 is stored in the HDD 404. However, the program 430 is not limited to this example. The program 430 may be recorded on any type of recording medium, as long as the recording medium is a computer-readable recording medium.

As a recording medium for supplying the program 430, for example, the ROM 402, the recording disk 431, or the external storage device 422 may be used. Specifically, the examples of the recording medium may include a flexible disk, a hard disk, an optical disk, a magneto-optical disk, a compact disc (CD)-ROM, CD-Recordable (CD-R), a magnetic tape, a nonvolatile memory, and a ROM.

Figure 3A:
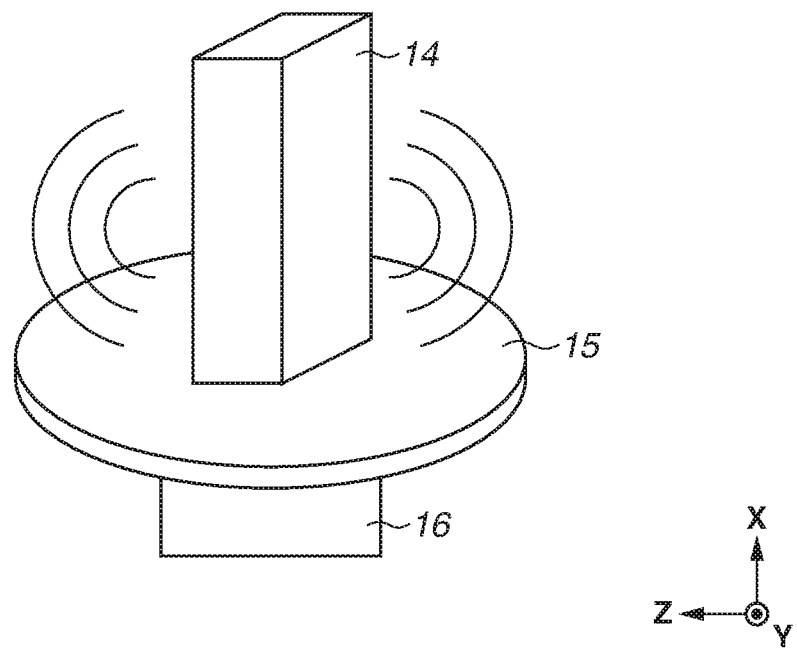
FIGS. 3A 3B, and 3C are explanatory diagrams each illustrating an antenna according to the exemplary embodiment.
Figure 3B:
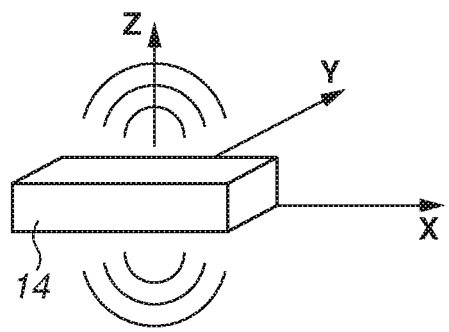
Figure 3C:
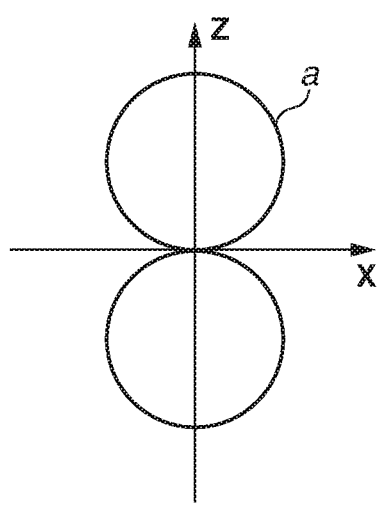

Next, the antennas 13 serving as the wireless communication unit used in the present exemplary embodiment will be described in detail with reference to FIG. 3. Assume that all the antennas 13-0 to 13-5 have the same configuration. FIG. 3A is a perspective view illustrating the antenna 13 as viewed in a predetermined direction. FIGS. 3B and 3C each illustrate a radiation pattern of the antenna 13.

Referring to FIG. 3A, the antenna 13 is composed of a chip antenna, and includes a chip 14, a turntable 15, and an antenna control device 16.

The chip 14 is mounted on the turntable 15 as illustrated in FIG. 3A, and the turntable 15 is configured to be rotated by a motor (not illustrated).

Driving of the motor for driving the turntable 15 is controlled by the antenna control device 16 so that the motor can be arbitrarily rotated. The antenna control device 16 acquires command values, such as a driving amount of the turntable 15, from the control device 400.

Each antenna control device 16 includes a controller for performing a wireless communication control including data modulation and demodulation. The controller included in the antenna control device 16 includes a radio wave intensity measurement unit that measures a radio wave intensity state of each antenna 13. The controller can measure a radio wave intensity in a current state.

Each antenna 13 is used for data communication about at least one axis of the joints $J_1$ to $J_4$ of the robot arm body 200. A single antenna 13 enables data communication corresponding to a plurality of axes such as two axes or three axes.

Each antenna 13 has different communication frequency bands in order to prevent interference among channels used for each antenna control device 16.

The number of the antennas 13 used in the present exemplary embodiment is six. However, the number of the antennas 13 to be used may be increased or decreased as needed.

Referring to FIG. 3B, when the chip 14 of the antenna 13 is installed on an XY plane with a radiation surface of the chip 14 facing upward, a large radio wave is radiated in a Z-axis direction as indicated by a radiation pattern "a" as illustrated in FIG. 3C. When the radiation surface of the chip 14 is rotated by the turntable 15, the radio wave can be radiated in a predetermined direction.

In the present exemplary embodiment, the radiation surface of the chip 14 is changed by the turntable 15 and the motor. However, instead of using this configuration, another configuration can be applied to the apparatus as long as the radiation surface of the chip 14 can be changed.

In the present exemplary embodiment, if a metallic object is disposed at a position where the radio wave radiated from the antenna 13 is blocked, the radio wave intensity is lowered. Accordingly, peripheral members are appropriately selected, arranged, and designed to prevent the metallic object other than the links of the robot arm body 200, from being disposed at the position where the radio wave radiated from the antenna 13 is blocked. Depending on the orientation of the robot arm, each link is inevitably disposed at the position where the radio wave radiated from the antenna 13 is blocked. In such a case, the radial radio wave from the antennas 13 is diffracted to perform communication.

Next, a wireless transmission control method depending on the orientation of the robot arm body 200 according to the present exemplary embodiment will be described with reference to a flowchart illustrated in FIG. 4.

A control processing flow illustrated in FIG. 4 is executed by the CPU 401 of the control device 400 by reading out the program 430.

Referring to FIG. 4, first, in step S101, it is determined whether a teaching operation for the robot arm body 200 is already executed.

If the teaching operation is not executed (NO in step S101), the processing proceeds to step S102. In step S102, the teaching operation is executed. In the present exemplary embodiment, the external input device 500 executes the teaching operation for the robot arm body 200. If the teaching operation is already executed (YES in step S101), the processing proceeds to step S104.

After that, when the teaching operation is completed, the processing proceeds to step S103. In step S103, a combination of the antennas 13 to be used for wireless communication is selected based on information about the orientation of the robot arm body 200 set by the teaching operation and positional information about each antenna 13 in each orientation.

The radio wave intensity state under a standard environment of each antenna 13 is stored in advance in the information about all orientations of the robot arm body 200.

In step S103, a combination of the antennas 13 in which the radio wave intensity enables communication among the antennas 13, is selected based on the stored data of the radio wave intensity of each antenna 13 according to the orientation information about the robot arm body 200 subjected to the teaching operation.

Figure 5A:
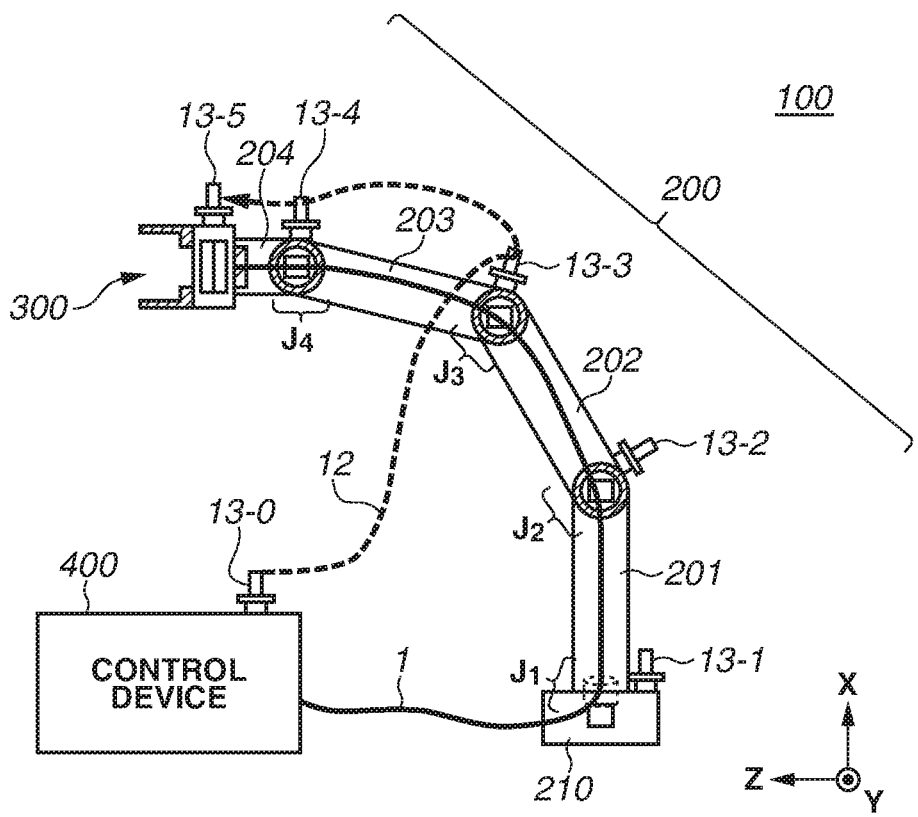
FIGS. 5A and 5B are plan views each illustrating a combination of antennas to be used depending on an orientation of a robot arm body according to the exemplary embodiment.
Figure 5B:
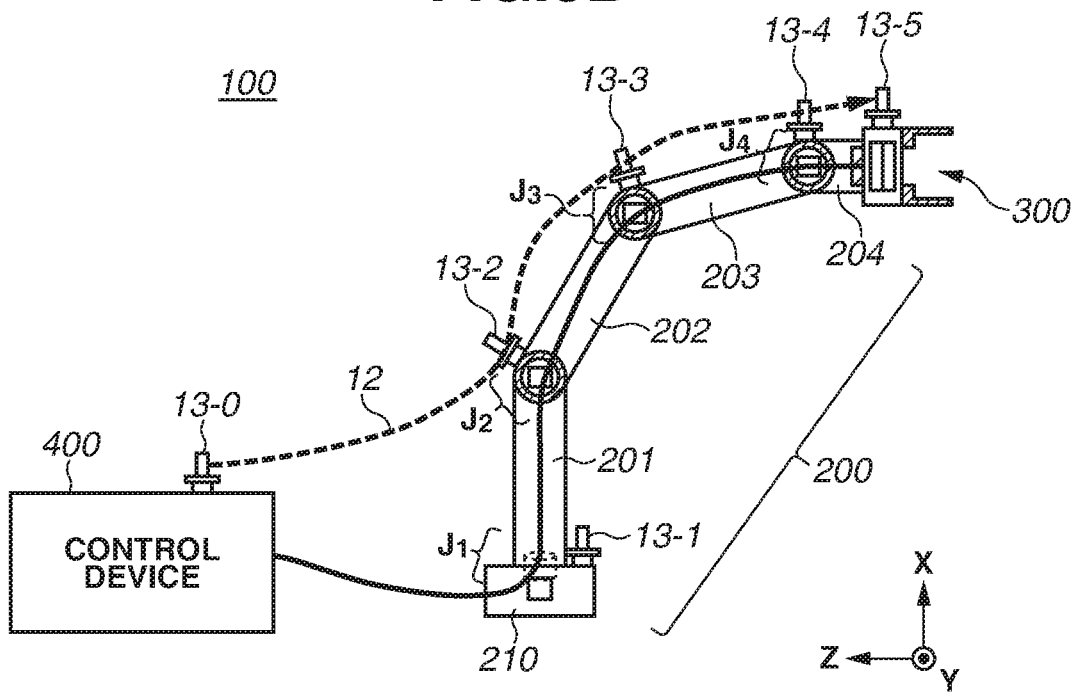

FIGS. 5A and 5B each illustrate a combination of the antennas 13 to be used depending on the orientation of the robot arm body 200. FIGS. 5A and 5B each illustrate a case where wireless data is transmitted from the antenna 13-0 to the antenna 13-5. FIG. 5A illustrates a case where the distance between the antenna 13-0 and the antenna 13-5 is relatively small. FIG. 5B illustrates a case where the distance between the antenna 13-0 and the antenna 13-5 is large.

The antenna 13-0 is a basic antenna that transmits command data created by the control device 400. Therefore, the antenna 13-0 is installed at a position where the location of the antenna is not changed depending on the orientation of the robot arm body 200. With this configuration, the command data indispensable for controlling the robot arm body 200 can be reliably transmitted.

Similarly, the antenna 13-1 is installed in the base 210 at a position where the location of the antenna is not changed depending on the orientation of the robot arm body 200.

In the present exemplary embodiment, a transmission form will be described using the antenna 13-0. However, depending on the intended use of the robot apparatus 100, the antenna 13-0 may be omitted. The antenna 13-1 and the control device 400 may be communicably connected with the power supply cable 1, and the antenna 13-1 may be used as the basic antenna.

Referring to FIG. 5A, in the case of transmitting wireless data from the antenna 13-0 to the antenna 13-5, a combination of the antennas 13-0, 13-3, 13-4, and 13-5 is selected and the antenna 13-3 and the antenna 13-4 are used as relays.

Referring to FIG. 5B, in the case of transmitting wireless data from the antenna 13-0 to the antenna 13-5, a combination of the antennas 13-0, 13-2, 13-3, 13-4, and 13-5 is selected and the antenna 13-2, the antenna 13-3, and the antenna 13-4 are used as relays.

As described above, in step S103, in the case of transmitting wireless data from a certain antenna to a certain antenna, a combination of antennas, including the antennas 13 to be used as relays, is selected depending on the orientation of the robot arm body 200 as described above.

In the present exemplary embodiment, a combination of antennas is selected depending on the orientation of the robot arm body 200. However, a combination of antennas may be selected depending on a distance between a transmitting antenna and a receiving antenna.

Next, in step S104, the robot arm body 200 is driven to measure the current radio wave intensity of each antenna 13.

Next, in step S105, the stored data on the radio wave intensity is compared with the radio wave intensity measured in an actual environment in step S104, and it is determined whether the difference between the radio wave intensities is more than or equal to a predetermined range.

This is because, in the process of driving the robot arm body 200 in step S104, the radio wave intensity measured in the actual environment may be different from the stored data on the radio wave intensity depending on the installation environment of the robot apparatus 100.

In this case, even if a combination of the antennas 13 in which the radio wave intensity enables communication when the robot arm body 200 is in a predetermined orientation, is selected based on the stored data of the radio wave intensity, the radio wave intensity may be insufficient in the actual environment.

If the radio wave intensity is smaller than an assumed value (YES in step S105), the processing proceeds to step S106. In step S106, the radio wave intensity is optimized to an intensity that enables communication, according to the state of the radio wave intensity in the actual environment.

As a method for optimizing the radio wave intensity, the number of the antennas 13 used as relays is increased based on the radio wave intensity kept by the combination of the antennas 13 currently selected.

FIG. 6 illustrates a case where the radio wave intensity is optimized to an intensity that enables communication if in the combination of the antennas 13 illustrated in FIG. 5A, the radio wave intensity is not sufficient.

Referring to FIG. 6, the antenna 13-2 is also used as a relay to optimize the radio wave intensity.

In the case of increasing the number of the antennas 13 to be used as relays, when data about driving of the robot arm body 200 is transmitted from the antenna 13-0, transmission order data indicating the name and order of antennas to be used as relays is transmitted together.

In the case of FIG. 6, the antenna 13-2 that is not used in the case of FIG. 5A is added as a relay. Accordingly, the transmission order data is transmitted together so that the data on driving of the robot arm body 200 is transmitted in the order of the antenna 13-2, the antenna 13-3, the antenna 13-4, and the antenna 13-5.

Thus, the data on driving of the robot arm body 200 can be transmitted through the wireless communication path 12 illustrated in FIG. 6, and the radio wave intensity can be optimized.

A direction of generating radio waves by the antenna 13-2, the antenna 13-3, and the antenna 13-4, which are used as relays, may be changed as needed.

After completion of the optimization of the radio wave intensity in step S106, the processing returns to step S105. In step S105, the current radio wave intensity of each antenna 13 is measured, and the stored data about the radio wave intensity is compared with the radio wave intensity measured in the actual environment, and then it is determined whether the difference between the radio wave intensities is more than or equal to the predetermined range.

In step S105, if the difference between the stored data about the radio wave intensity and the radio wave intensity measured in the actual environment is smaller than the predetermined range, it is determined that the optimization of the radio wave intensity is completed (NO in step S105) and then the processing flow is terminated.

As described above, in the present exemplary embodiment, a combination of the antennas 13 to be used for communication is selected or changed, as needed, based on the orientation of the robot arm body 200 and the state of the radio wave between the antennas 13, thereby changing the wireless communication path as a transmission path for data transmission.

In other words, it is possible to switch a communication method from directly transmitting the data to a target antenna, to increasing the antennas 13 as the relays and indirectly transmitting the data.

Consequently, even when the wireless communication is interrupted for various reasons, the occurrence of an erroneous operation and a real-time loss can be reduced, and thus a stable wireless communication can be achieved.

Further, the communication path is changed depending on the orientation of the robot arm body 200, and the number of the antennas 13 to be used is changed. Thus, a time required for data transmission can be changed depending on the orientation of the robot arm body 200, so that an efficient communication can be achieved.

Figure 7:
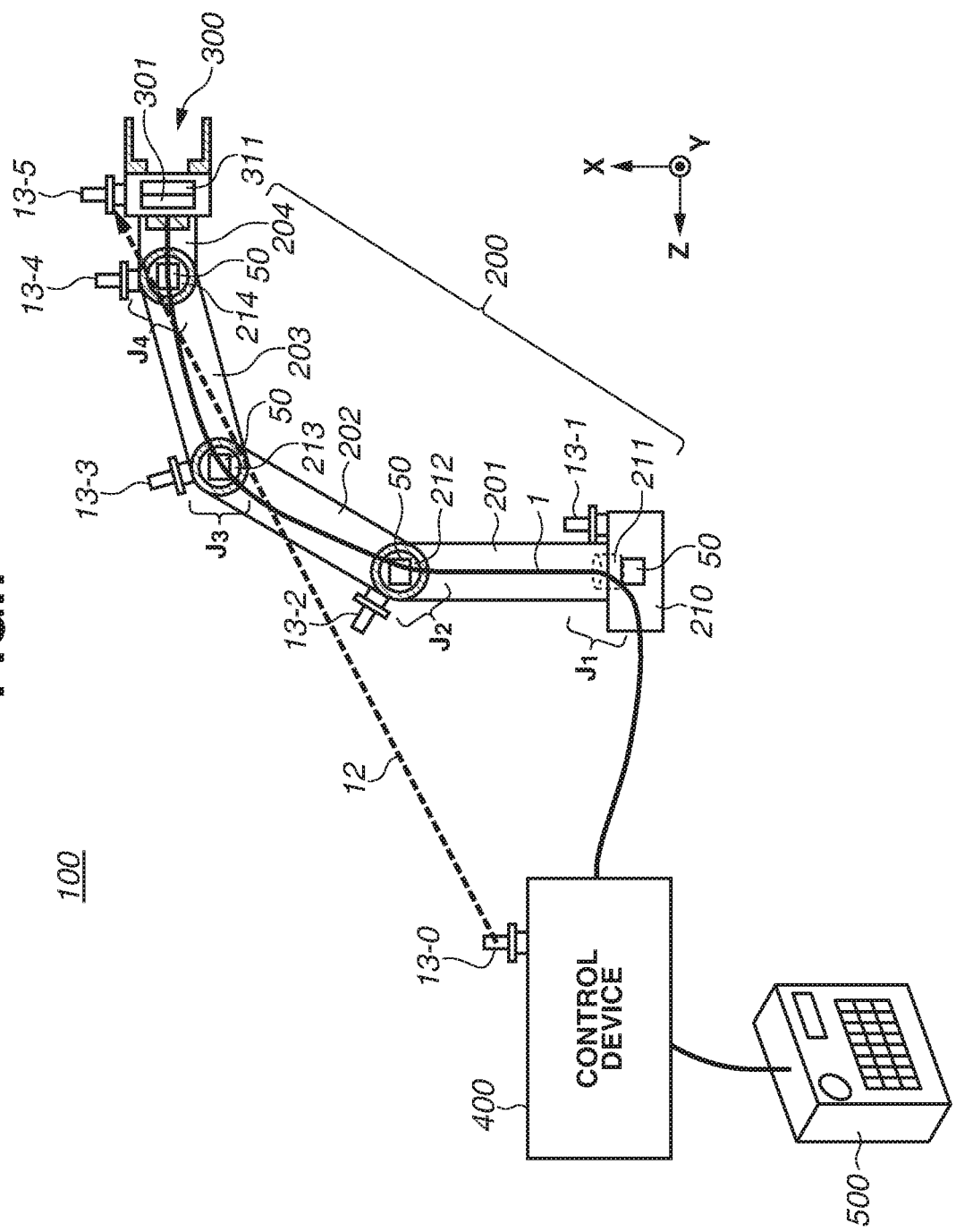
FIG. 7 is a plan view illustrating an advantageous effect according to the exemplary embodiment.

The present embodiment described above illustrates an example where the radio wave from each antenna 13 is a wave that is likely to be diffracted. On the other hand, a case will be considered where wireless communication using a system with a frequency of 1 GHz or higher and a high rectilinear advancing property. In this case, when data communication is performed using the antennas 13-0 to 13-5, as illustrated in FIG. 7, a plurality of links is located in the robot arm body 200, which makes it difficult to perform communication in a state where the radio wave is diffracted.

Figure 8:
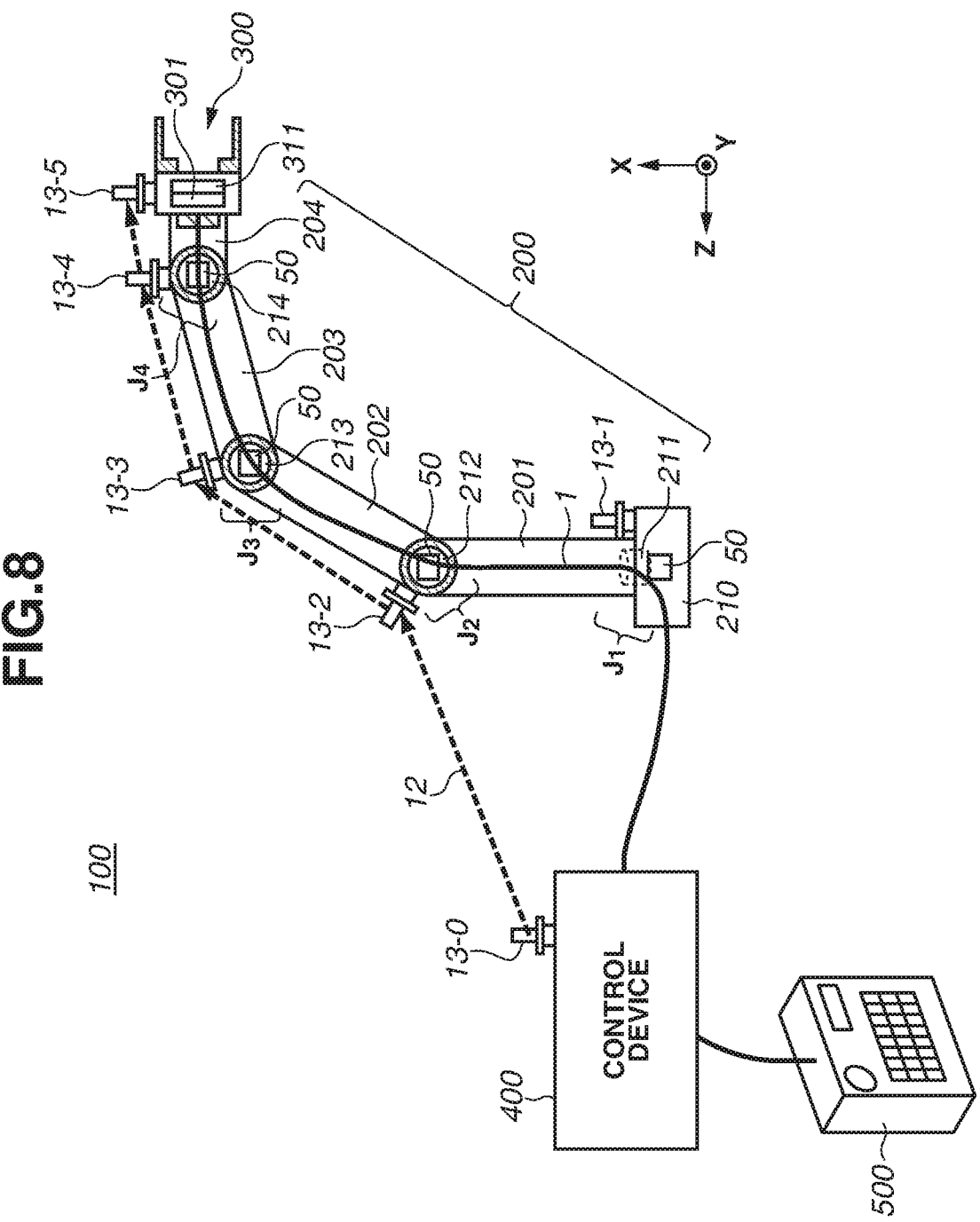
FIG. 8 is a plan view illustrating another advantageous effect according to the exemplary embodiment.

However, a communication path can be formed along each link as illustrated in FIG. 8 by providing antennas at a plurality links of the robot arm body 200 and by using the links as antenna relays for the respective joints. Accordingly, it is possible to prevent each link of the robot arm body 200 from interfering with the communication. In particular, the links of the robot arm body 200 is not deformed if no impact is applied to the links. Therefore, the position of each antenna 13 is stabilized, and thus the above-described method is suitable for wireless communication in a system with a high rectilinear advancing property.

The method for optimizing the radio wave intensity executed in step S106 is not limited to the method described above. For example, a method can be employed and carried out in which each antenna 13 is configured to change the installation position of each antenna 13 with a motor or the like (not illustrated).

Figure 9:
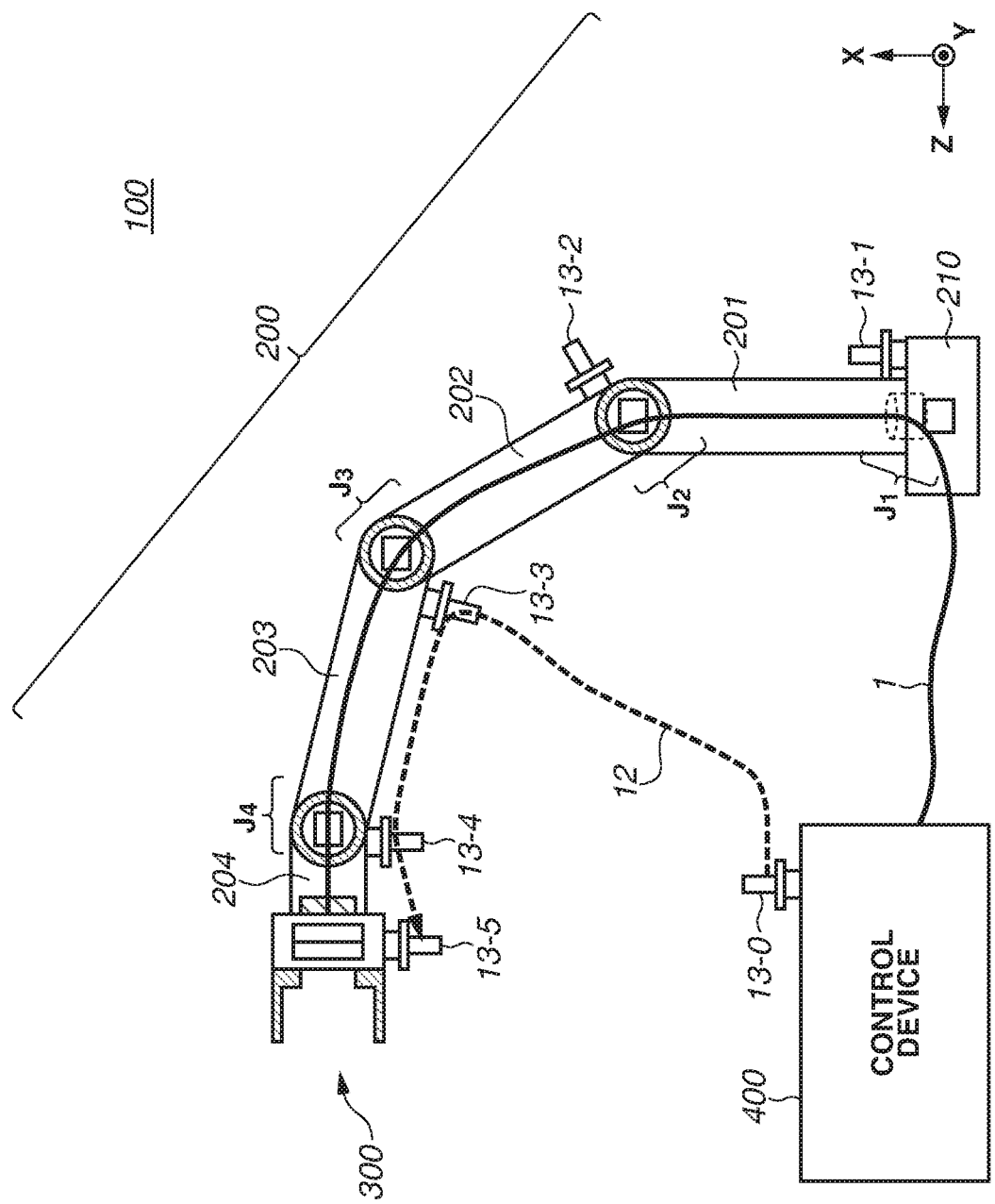
FIG. 9 is a plan view illustrating a case where installation positions of antennas to be used are changed according to the exemplary embodiment.

FIG. 9 illustrates a case there the positions of the antennas 13-3, 13-4, and 13-5 are changed to optimize the radio wave intensity. Referring to FIG. 9, the positions of the antennas 13-3, 13-4, and 13-5 are changed so as to approach the antenna 13-0.

As a method for causing the antennas 13-3, 13-4, and 13-5 to approach the antenna 13-0, a linear guide or the like is disposed at a predetermined position of each link, thereby enabling each antenna 13 to travel along the linear guide.

Further, each antenna 13 is connected to a motor with a belt. When the motor is driven, the antenna 13 can be moved on the linear guide by the belt.

By changing the installation position of each antenna 13 as described above, the radio wave intensity can be optimized with a combination of originally used antennas. It is also possible to prevent each link of the robot arm body 200 from standing in the communication path as illustrated in FIG. 9, which leads to a further improvement in stability of communication.

Although it will not be described in detail, the direction of the radio wave radiated from each antenna 13 may be changed, as needed, by a beamforming technique depending on the orientation of the robot arm, and the ratio wave intensity may be optimized to an intensity that enables communication.

In the exemplary embodiment described above, the antennas 13 provided on the robot arm body 200 are used as relays. However, depending on the operation of the robot arm body 200, only the antenna 13-1, which is provided on the base 210, may be used as a relay. If the robot arm body 200 has a small operation range, only the antenna 13-1 disposed on the base 210, which is a basal portion of the robot arm body 200, can cover the range. In that case, the data may be sent from the control device 400 to the antenna 13-1, and the data may also be sent to each unit based on the antenna 13-1.

The first exemplary embodiment described above illustrates a specific example where the processing procedure is executed by the control device 400. However, a control program of software for executing the above-described functions, and a medium recording the program may be loaded in the external input device 500 to carry out the program.

Accordingly, the control program of software for executing the above-described functions, the recording medium recording the control program, and a communication device constitute the present disclosure.

The exemplary embodiment described above illustrates a case where a ROM or RAM is used as a computer-readable recording medium, and the control program is stored in the ROM or RAM. However, the present disclosure is not limited to this configuration.

The control program for carrying out the present disclosure may be recorded on any recording medium, as long as the recording medium is a computer-readable recording medium. Examples of the recording medium for supplying the control program may include an HDD, an external storage device, and a recording disk.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the exemplary embodiment described above, the antennas 13 are provided on the control device 400 to perform communication, but instead the antennas 13 may be installed at locations other than the control device 400 to perform communication.

The exemplary embodiment described above illustrates an example where the robot hand body 300 is used as a data communication target. However, the data communication target is not limited to this example. For example, the antennas 13-1 to 13-4 may be used to communicate with the motors 211 to 214 for driving the joints $J_1$ to $J_4$ of the robot arm body 200. In this case, the present disclosure can be carried out by employing a configuration in which an antenna is provided on each arm motor drivers 50 to enable data transmission and reception.

The exemplary embodiment described above illustrates an example where the antennas 13 each serving as the wireless communication unit can generate a radio wave. However, the wireless communication unit is not limited to this example. For example, in the robot arm body 200, some of the wireless communication units may be connected by a wired connection, and wireless communication units that cannot generate any radio wave may be used.

In the exemplary embodiment described above, wireless communication is performed using the antennas 13. However, the wireless communication is not limited to this example. For example, an information terminal, such as a smartphone or a personal computer (PC), which includes a wireless communication function, such as Wi-Fi, may be used as the control device 400 and the information terminal or PC may wirelessly communicate with the robot apparatus 100.

The various exemplary embodiments described above illustrate a case where the robot apparatus 100 uses an articulated robot arm including a plurality of joints. However, the number of joints is not limited to this example. A vertical multiaxial configuration is illustrated as a form of the robot apparatus 100. However, a configuration similar to the configuration described above can be carried out using joints of different forms such as parallel link type joints.

The various exemplary embodiments described above illustrate configuration examples of the robot apparatus 100 with reference to the drawings illustrating the respective exemplary embodiments. However, the present disclosure is not limited to these examples. The design of the robot apparatus 100 according to the present disclosure can be arbitrarily changed by one skilled in the art. Each motor provided in the robot apparatus 100 is not limited to the above-described configuration, but instead a device, such as an artificial muscle, or the like may be used as a drive source for driving each joint.

The various exemplary embodiments described above can be applied to any machine capable of automatically performing expansion and contraction, bending and stretching, moving upward or downward, moving leftward or rightward, or turning operation, or a combination of these operations, based on information stored in the storage device provided in the control device 400.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-036673, filed Feb. 28, 2019, which is hereby incorporated by reference herein in its entirety.

What is claimed is:

1. A control method for a robot apparatus that includes
a robot arm having a plurality of links, a first control device disposed in the robot arm, a second control device, a wireless communication unit disposed in each of at least two links of the plurality of links and configured to enable the first control device and the second control device to communicate with each other wirelessly,
the control method comprising:
acquiring, by the second control device, data to be transmitted to the first control device; and
transmitting, by the second control device, the data to the first control device by using the wireless communication unit disposed in each of at least two links of the plurality of links.

2. A robot apparatus comprising:
a robot arm including a plurality of links;
a first control device disposed in the robot arm;
a second control device; and
a wireless communication unit configured to enable the first control device and the second control device to communicate with each other wirelessly,
wherein the wireless communication unit is disposed in each of at least two links of the plurality of links.

3. A communication method for a communication device that communicates with a control device disposed in a robot arm including a plurality of links,
wherein a predetermined number of links among the plurality of links is provided with a wireless communication unit configured to enable the communication device and the control device to communicate with each other wirelessly,
the communication method comprising:
acquiring, by the communication device, data to be transmitted to the control device;
transmitting, by the communication device, the data to the control device by using the wireless communication unit, and
wherein in a case where the communication device communicates with the control device, the communication device changes the wireless communication unit to be used based on an orientation of the robot arm to alter a communication path.

4. A communication device that communicates with a control device disposed in a robot arm including a plurality of links, the communication device including a processing unit,
wherein a predetermined number of links among the plurality of links is provided with a wireless communication unit configured to enable the communication device and the control device to communicate with each other wirelessly,
wherein the processing unit acquires data to be transmitted to the control device,
wherein the processing unit transmits the data to the control device by using the wireless communication unit, and
wherein in a case where the processing unit communicates with the control device, the processing unit changes the wireless communication unit to be used based on an orientation of the robot arm to alter a communication path.

5. A control method for a robot apparatus that includes
a robot arm having a plurality of links, a first control device disposed in the robot arm, a second control device and a wireless communication unit, disposed in the predetermined number of links among the plurality of links and configured to enable the first control device and the second control device to communicate with each other wirelessly,
the control method comprising:
acquiring, by the second control device, data to be transmitted to the first control device; and
transmitting, by the second control device, the data to the first control device by using the wireless communication unit wherein in a case where the second control device communicates with the first control device, the second control device changes the wireless communication unit to be used based on an orientation of the robot arm to alter a communication path.

6. The control method according to claim 5,
wherein in a case where the second control device communicates with the first control device, the second control device changes the wireless communication unit to be used based on an orientation of the robot arm to alter a communication path.

7. A non-transitory computer-readable recording medium storing a control program for causing a computer to execute the control method according to claim 5.

8. A robot apparatus comprising:
a robot arm including a plurality of links;
a first control device disposed in the robot arm;
a second control device; and
a wireless communication unit configured to enable the first control device and the second control device to communicate with each other wirelessly,
wherein the wireless communication unit is disposed in a predetermined number of links among the plurality of links, and
wherein in a case where the second control device communicates with the first control device, the second control device changes the wireless communication unit to be used based on an orientation of the robot arm to alter a communication path.

9. The robot apparatus according to claim 8, further comprising a plurality of first control devices,
wherein the first control device is disposed in the predetermined number of links among the plurality of links, and
wherein in a case where the second control device communicates with a predetermined first control device among the plurality of the first control devices, the second control device selects a combination of the wireless communication unit to be used based on an orientation of the robot arm.

10. The robot apparatus according to claim 9, wherein in a case where the second control device communicates with the predetermined first control device among the plurality of the first control devices, the second control device changes the combination of the wireless communication unit to be used based on a radio wave state of each of the wireless communication unit.

11. The robot apparatus according to claim 9,
wherein the robot arm is provided with an end effector,
wherein the end effector is provided with the first control device and the wireless communication unit, and
wherein in a case where the second control device communicates with the first control device of the end effector, the second control device selects a combination of the wireless communication unit to be used among the wireless communication unit based on a distance between the wireless communication unit disposed in the second control device and the wireless communication unit disposed in the end effector.

12. The robot apparatus according to claim 9, wherein in a case where the second control device communicates with the predetermined first control device among the plurality of the first control devices, the second control device switches a communication method from a direct communication to an indirect communication based on an orientation of the robot arm, the direct communication being a method of directly communicating with the wireless communication unit disposed in the predetermined first control device as a communication target, the indirect communication being a method using another wireless communication unit different from the wireless communication unit disposed in the predetermined first control device.

13. The robot apparatus according to claim 8, wherein a predetermined wireless communication unit among the wireless communication unit is installed at a position where a position of the wireless communication unit remains unchanged regardless of an orientation of the robot arm.

14. The robot apparatus according to claim 8,
wherein each of the wireless communication unit is provided with a shift unit configured to shift a position of each of the wireless communication unit, and
wherein in a case where the second control device communicates with the predetermined first control device among the plurality of the first control devices, the shift unit is used to shift the position of each of the wireless communication unit based on the orientation of the robot arm.

15. The robot apparatus according to claim 14, wherein in a case where the second control device communicates with the predetermined first control devices among the plurality of the first control devices, the shift unit is used to shift the position of each of the wireless communication unit based on a radio wave state of each of the wireless communication unit.

16. The robot apparatus according to claim 8, wherein the wireless communication unit is disposed in each of the plurality of links.

17. The robot apparatus according to claim 16, wherein a communication path of the wireless communication unit is along the predetermined number of links among the plurality of links.

18. The robot apparatus according to claim 17, wherein a communication frequency band of the wireless communication unit is 1 GHz or higher.

19. The robot apparatus according to claim 1, wherein the wireless communication unit disposed in the robot apparatus is used as a relay during communication between the first control device and the second control device.

20. The robot apparatus according to claim 19, wherein the wireless communication unit changes a generation direction of a radio wave in a case where the wireless communication unit is used as the relay.

21. The robot apparatus according to claim 8, wherein the wireless communication unit includes an antenna, a chip, a turntable, and an antenna control device.

22. The robot apparatus according to claim 21, wherein the antenna control device includes a radio wave intensity measurement unit configured to measure a radio wave intensity of the antenna.

23. The robot apparatus according to claim 8, wherein communication frequency bands of the wireless communication unit are different from each other.

24. A method of manufacturing an article, the method comprising:
manufacturing an article by using the robot apparatus according to claim 8.

* * * * *